March 1, 1966 H. M. KNOTH Re. 25,972

WAFERING MACHINE CONVERTIBLE DIE STRUCTURE

Original Filed Jan. 2, 1962

INVENTOR.
H. M. KNOTH

United States Patent Office

Re. 25,972
Reissued Mar. 1, 1966

25,972
WAFERING MACHINE CONVERTIBLE DIE STRUCTURE

Harold M. Knoth, Davenport, Iowa, assignor to Deere & Company, Moline, Ill., a corporation of Delaware Original No. 3,198,141, dated Aug. 3, 1965, Ser. No. 163,650, Jan. 2, 1962. Application for reissue Aug. 4, 1965, Ser. No. 479,041
10 Claims. (Cl. 107—14)

Matter enclosed in heavy brackets [ ] appears in the original patent but forms no part of this reissue specification; matter printed in italics indicates the additions made by reissue.

This invention relates to a wafering machine such as is customarily used for the wafering or pelleting of agricultural forage crops such as hay, grasses, straw and the like. More particularly, the invention relates to the die structure and means for converting that structure from a single-row to a multiple-row annulus.

The die structure in a typical wafering machine as presently known will usually comprise an annulus made up of a pair of ring-like side elements coaxially spaced apart in relatively close parallel relation and provided with a plurality of uniformly circumferentially spaced generally radial die blocks or spacers rigidly interposed between the side members and affording a like plurality of generally radial die cells or openings, each normally of rectangular cross section and having a radial length in proportion to the transverse dimension. It is customary to produce wafers on the order of two-by-two-by-two inches, but the length of a die cell is somewhat longer than that, the ultimate length of the pellet or wafer being achieved by means for breaking off the wafered material as it is extruded to a certain distance.

Fundamentally, die structures of this nature distinguish from those known in the so-called pellet mill art, because in that art the annuli are made up largely of forgings or castings in which a plurality of relatively small die openings are provided, which is possible because in that art the machines handle pulverulent material of relatively uniform density. In the agricultural field, the material, as distinguished from being pulverulent, is stemmy, leafy, etc. and the moisture content thereof varies not only from field to field but also from windrow to windrow in the same field. Moreover, the crops are apt to occur in considerable mixtures, because of the occurrence of different types of grasses, for example, in alfalfa, clover and the like. Because of these characteristics of the material, it is often desirable to modify the die structure, not only to vary the compression characteristics on the material but often to vary the size of the ultimate product. It is known, in this respect, to provide the die structure with radial splitter means whereby the single circumferential row of die cells is divided into two circumferential rows of smaller die cells; that is, the die cells are divided as to cross-sectional area. However, in the prior art, the utilization of such splitter means requires substantially complete disassembly of the die structure and almost insurmountable obstacles arise when this task is attempted to be performed in the field. According to the present invention, the problem involved in converting a single-row annulus to a multiple-row annulus is solved by the provision of individual insertable splitters, one for each die cell. It is an object of the invention to arrange these splitters in such manner that they may be readily inserted radially into the die without requiring any disassembly or modification of the die. A still further object of the invention is to provide splitters which may be radially inserted from the track of the die, the track being that portion of the periphery thereof on which a press wheel or wheels rides to compact and extrude the material as wafers. It is also an object of the invention to utilize the insertion feature in connection with other movable walls of the die, whereby such movable walls may be associated with means for varying the lateral pressure on the die cells adjacent to their discharge ends, the basic principle of which is exploited for the purpose of varying the density of the wafers.

The foregoing and other important objects and features inherent in and encompassed by the invention will become apparent as a preferred embodiment thereof, together with a modification, is disclosed in detail in the ensuing description and accompanying sheet of drawings, the figures of which are described below.

Figure 2:
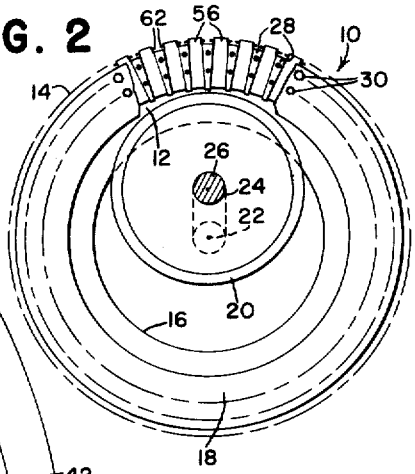
FIG. 2 is an elevational view, partly in section and drawn to a reduced scale, showing the association between the typical die and a typical press wheel.

Reference will be had first to FIG. 2 for the purpose of explaining the environment of the invention. The numeral 10 represents in its entirety the annulus making up the basic die structure, which annulus may be regarded as having inner and outer peripheries 12 and 14 respectively. The annulus in this case is made up of a pair of closely coaxially spaced apart ring-like side members or elements 16 and 18, each having an inside diameter somewhat smaller than that of the inner periphery of the annulus 10, so that the inner periphery 12 and the marginal portions of the rings afford a track over which a press wheel 20 rides or rolls as it orbits about the axis 22 of the annulus by means of a crank shaft 24 journaling the press wheel at its center as at 26. In the present case, the crank shaft, journaled at its axis 22 on any suitable support, not shown, which also fixedly carries the die, turns in a counterclockwise direction, carrying the wheel therewith, which will of course turn in a clockwise direction about its own axis.

Figure 4:
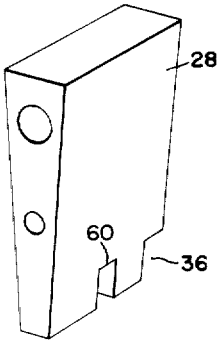
FIG. 4 is a perspective of one of the die blocks or spacers.

Rigidly disposed between the side elements 16 and 18 is a plurality of uniformly circumferentially spaced generally radial die blocks or spacers 28, each of which is wedge-shaped, having its smaller end at the inner periphery 12 or track of the annulus 10 and its larger or outer end adjacent to the outer periphery 14 of the annulus. One of these die blocks is shown by itself in FIG. 4. The means by which the die blocks 28 are rigidly assembled with the side members 16 and 18 are here shown as a series of bolts 30; although, any other suitable means may be used. The circumferential row or series of die blocks 28 thus affords a like plurality of radial die cells or openings 32 through which material is extruded radially outwardly in the form of wafers because of the compressing action of the press wheel 20, rolling around the track at the inner periphery 12 of the annulus. Thus far, it will be seen that wafers or pellets thus extruded will have the same cross-sectional area as the die cells 32, with the exception that each die cell is reduced as to cross section by the provision therein of a movable wall 34 which is associated with and provides part of means for adjusting the cross-sectional area of the openings so as to vary the density of the wafers, a broad principle which is itself already known.

In the present case, one of the features of the invention is to utilize a novel mounting of the movable wall 34, which in this case takes the form of the provision in each die block or spacer 28 of a recess or notch 36 which opens radially at the track or inner periphery 12 of the annulus. The notches 36 are alined in a circumferential row closely adjacent to the inner surface of the side wall or element 16 and this row of notches is capacitated to individually mount a plurality of the walls 34.

Figure 1:
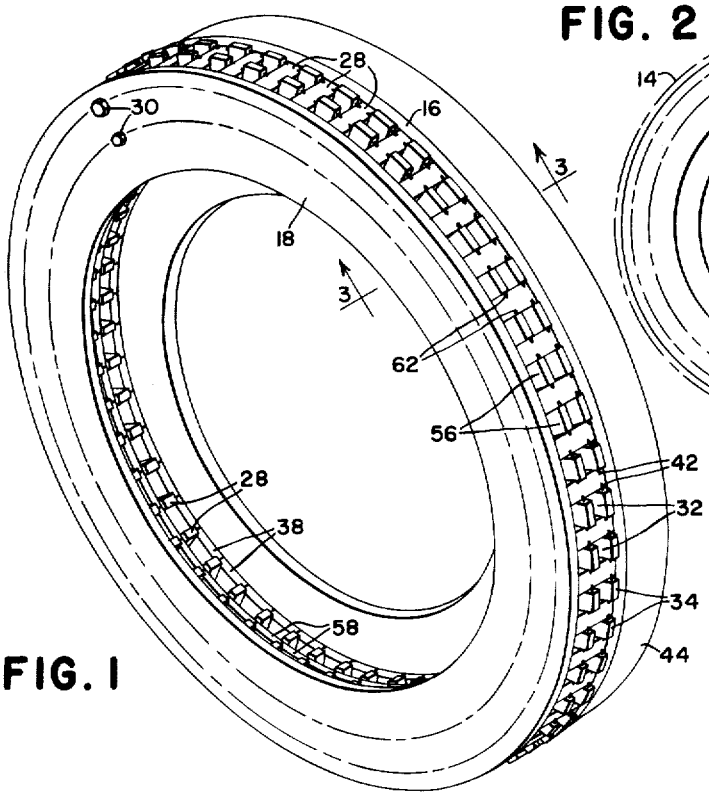
FIG. 1 is a perspective view of a typical annular die structure embodying one form of the invention.
Figure 3:
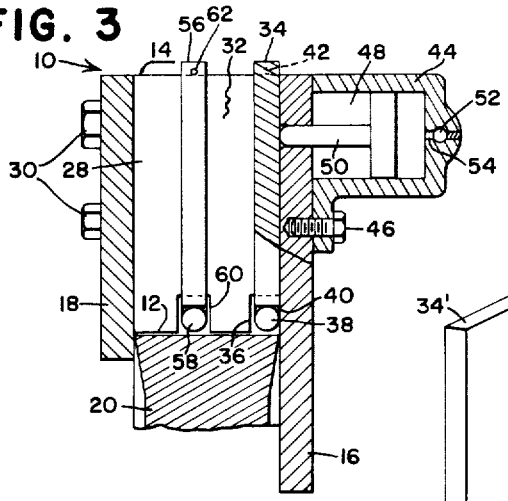
FIG. 3 is an enlarged sectional view as seen generally along the line 3—3 of FIG. 1, with a portion of the press wheel added.
Figure 5:
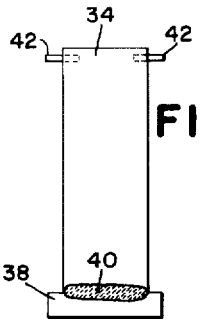
FIG. 5 is an elevation of one of the insertable walls.

One of these walls is shown by itself in FIG. 5 and, in FIG. 3 as well as in FIG. 1, it will be seen that the length thereof is such, relative to the radial length of the die cell 32, as to extend from the inlet end of the die cell, at the track 12, to the outlet end thereof at the outer periphery 14 of the annulus. The width of the member or wall 34 is consonant with the circumferential dimension of the die cell, it being understood that since the die cells are identical, the walls or members 34 will be identical. At its lower or radially inward end, each wall 34 has provided thereon a pintle 38, in this case secured to the wall as by welding at 40. The pintle is greater in length than the width of the wall so that opposite end portions thereof project beyond opposite edges of the wall, and it is these portions that are received in the circumferentially alined notches 36 of a pair of neighboring spacers or die blocks 32. The pintles 38 are visible in the lower left-hand portion of FIG. 1, as well as in FIGS. 3 and 5. Each pintle 38 is circular in cross section and somewhat smaller in diameter than the dimensions of the corresponding recesses 36, whereby each wall 34 is pivotally mounted at its track-proximate end, it being noted that the pintle 38 is exposed to the track, which is a feature of the invention, since the walls or plates 34 may be radially outwardly inserted into the annulus from the track thereof, which is a simple and convenient field installation, which takes on added importance when it is recognized that the plates or walls are individually mounted and thus may be removed and replaced at will, as in instances of damage or similar situations.

In the initial installation of a member or wall 34, the relationship between the pintle 38 and the notches 36 that receive the end portions of same will be quite loose and, to prevent radial displacement inwardly of the walls, each is provided with means for retaining same in place. In the present case, the radially outer end portion of each member, which goes beyond the outer periphery 14 of the annulus, is drilled at opposite edges to receive a pair of retainer pins 42. These, as will be clearly seen, project circumferentially or in overhanging relationship to the outer ends of neighboring blocks 28; although, they could just as well engage any other adjacent portion of the annulus, consistent with permitting clear passage of the wafers through the outer or discharge ends of the cells 32. The pins 42 are of course easily installed after radially outward insertion of the members 34. During subsequent operation, it is of course expected that the portions of the recesses 36 not filled by the pintles 38 will accumulate material which will necessarily retain the members 34 in place, even though it will allow the pivotal movement thereof.

Figure 6:
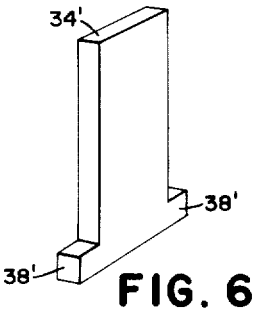
FIG. 6 is a perspective of a modified form of insertable wall or member.

As an alternative to this construction, a modified form of plate 34' is shown in FIG. 6, the lower end portion of which has projecting side pieces or parts 38' which are of rectangular section and preferably dimensioned to have a force-fit with the associated recesses 36. Thus, the modified member 34' may be radially inserted just as the member 34, except that it will be forcibly driven into place and therefore will not require the retainer pins 42. Other equivalents of these two retaining means will readily occur on the basis of the examples given. In the case of the member 34', bending thereof intermediate its ends will be relied upon as the equivalent of the pivotal action obtainable from the pintle 38 in the case of the member 34, which is significant from the standpoint of the association of one member or the other, in a complete set of course, with means for varying or "choking" the ends of the die cells by what is known as density control, a typical example of which is disclosed here in the form of an annular fluid pressure manifold 44 secured as by cap screws 46 to the outer surface of the side wall or element 16. This manifold is provided with a plurality of individual cylinders 48, one for each movable wall or member 34 (34'), the element 16 being drilled in axial register with the movable walls for accommodating piston rods 50 respectively on pistons in the cylinders 48. An annular manifold passage 52 connects the cylinders 48 in parallel with each other via short axial passages 54, one for each cylinder. Fluid under pressure introduced to the manifold passage 52 will of course affect the pistons in the cylinders 48 and the forces transmitted will be imparted to the movable walls 34. Variations in fluid pressure will of course result in variations of the forces applied and therefore will be reflected in different amounts of movement of the members 34, which pivot about their lower ends at 38 to restrict or expand the discharge ends of the die cells. In the case of the alternative wall 34', it will bend substantially in the area of its force-fit connection with the associated blocks. The details of the density control means are already known and need not be elaborated here.

The description thus far has proceeded on the basis of an annular die having a single circumferential row or set of die cells 32. However, it is a further feature of the invention to provide simple and convenient means whereby the single-row structure may be readily converted to a multiple-row structure, in this case by doubling the number of die cells by means of splitting the circumferential row into two circumferential rows of smaller cells. In other words, each cell is "split" in its transverse dimensions so that the wafers instead of being two-by-two will in effect be two-by-one (of course allowing for the axial thickness of the splitter means about to be described).

Each splitter means takes the form of a plate-like member 56 which may here be identical to the movable wall 34 or 34'. Such splitter or divider members will have at their lower ends pintles 58 similar to those described at 38, and these will be respectively received in a circumferential row of notches or recesses made up by one notch or recess 60 in the inner or track-proximate end of each die block or spacer 28. The pintles 58 are visible to some extent in the lower left-hand portion of FIG. 1 as well as in FIG. 3. The circumferential row of recesses 60 is disposed intermediate the inner surfaces of the side elements 16 and 18. In this case, the disposition is centrally between these elements. In a situation in which several splitters were used for each die cell, the circumferential rows would of course be spaced accordingly.

The walls or splitter members 56 are, like the walls 34 or 34', radially outwardly insertable into the annulus from the interior thereof, and for this purpose each has at its outer end removable retainer pins 62. Here again, the plates 34' could be duplicated and again a force fit would occur between the track-proximate ends of such members and the recesses 60 in the intermediate circumferential row. In those cases where density control is used, as by provision of the movable wall in each die cell, the partition or splitter member 56 would partake of the density control, because of the intervention of the material between the two walls. That is to say, material would occur in each die cell 32 betwen the associated splitter plate 56 and the interior surface of the side element 18 on the one hand and between the splitter or partition plate and the interior surface of the movable wall 34 on the other hand. Thus, force imparted to the movable wall 34 by its cylinder piston means 48–50 would compress the material between the walls 34 and 56 as well as that between the walls 56 and 18, it being clear that movement of the wall 56 toward the wall 18 would be substantially half the amount of the movement of the wall 34 toward the wall 56. This would be true regardless of the types of walls used (as between 34 and 34'). In the case of duplication of walls 34', bending action would occur rather than pivoting.

In a die structure in which density control is not employed, the circumferential row of recesses 60 could be arranged centrally between the walls 16 and 18, because there would be no intervening wall 34. In such case the force fit at the recesses 60 would be preferable, or some other means could be readily provided adjacent to the outer ends of the splitter members to prevent displacement thereof laterally of the circumferential row of doubled die cells.

As would be expected, the recesses 60 will accumulate material when the machine is operated without the splitter plates 56, but it is a simple matter to remove this material for the insertion of the splitter plates. Likewise, the accumulation of material after the splitter plates are installed does not prevent withdrawal of the splitters, since the pins 62 may be readily removed and the splitters simply tapped radially inwardly to drop out of their respective pockets. The same is true of the walls 34, which is likewise true of the walls 34', whether used as movable walls or splitter members.

One advantage of the provision of the walls 34 or 56 as individual members is that they may be readily replaced, removed or installed without affecting the others and clearly without affecting the basic structure of the annulus 10. This is important when it is considered that some of these walls are very often damaged by the encountering of foreign material in the wafering process, since it is not uncommon that the machine, in progressing over a field, will pick up rocks, rake teeth and other hard foreign objects. The convenience of removal and installation of the walls is also significant when the convertability feature is regarded, since these procedures may be easily and simply performed in the field with a few simple tools.

Features and advantages in addition to those categorically enumerated will readily occur to those versed in the art, as will many modifications and alterations in the preferred embodiments disclosed, all of which may be achieved without departure from the spirit and scope of the invention.

What is claimed is:

1. Die structure for a wafering machine, comprising: an annulus including inner and outer peripheries and having a pair of coaxially spaced apart ring-like side elements and a plurality of uniformly circumferentially spaced apart generally radial spacers affording a like plurality of generally radial die cells having radially opposite inner and outer ends opening respectively at said inner and outer peripheries of the annulus and each spacer likewise having radially opposite inner and outer ends respectively at said inner and outer peripheries, each spacer having at one end a notch opening radially to the adjacent periphery and also opening circumferentially, said notches being alined in a circumferential row at the same periphery; a plurality of individual plate-like members equal in number to the cells, one member being disposed in each cell and extending radially from one end toward the other end thereof, each member being dimensioned for individual radial insertion into and radial withdrawal from its cell at the end of said cell at said same periphery, said members respectively having end portions adjacent to said row of notches and each member having at said end portion a mounting part received in a notch in said row; and *securing* means *removably carried by* [on] each member for removably securing it in place.

2. The invention defined in claim 1, in which: said securing means comprises, on each member, a removable retainer at the end of the member opposite to its end that has the mounting parts, said retainer normally engaging the annulus at its other periphery to prevent radial withdrawal of said member.

3. The invention defined in claim 1, in which: said row of notches lies closely adjacent to one of the side elements to carry the members also closely adjacent to said one element.

4. The invention defined in claim 1, in which: said row of notches lies intermediate the side elements to carry the members also intermediate said side elements.

5. The invention defined in claim 1, in which: said row of notches lies closely adjacent to one of the side elements to carry the members also closely adjacent to said one element, and said ends of the spacers are formed with notches alined in a circumferential row intermediate said first-named row and the other side element, and said second named row of notches carries a second plurality of radial plate-like members similar to those first named, said members in said second plurality lying respectively intermediate the first-named members and said other side element *and respectively having end portions adjacent to said second row of notches*, each of said second named members having at said end portion a mounting part received in neighboring notches in said second row, and each second member having means for removably securing it in place.

6. Die structure for a wafering machine, comprising: an annulus including inner and outer peripheries and having a pair of coaxially spaced apart ring-like side elements and a plurality of uniformly circumferentially spaced apart generally radial spacers affording a like plurality of generally radial die cells having radially opposite inner and outer ends opening respectively at said inner and outer peripheries of the annulus and each spacer likewise having radially opposite inner and outer ends respectively at said inner and outer peripheries, each spacer having at one end a notch opening radially to the adjacent periphery and also opening circumferentially, said notches being alined in a circumferential row at the same periphery; a plurality of individual plate-like members equal in number to the cells, one member being disposed in each cell and extending radially from one end toward the other end thereof, each member being dimensioned for individual radial insertion into and radial withdrawal from its cell at the end of said cell at said same periphery, said members respectively having end portions adjacent to said row of notches and each member having at said end portion a pair of circumferentially oppositely extending parts *exposed directly to the periphery at which the notches open radially, said parts being* received respectively in the notches of a neighboring pair of spacers; and *securing* means *removably carried by* [on] each member for removably securing it in place.

7. Die structure for a wafering machine, comprising: an annulus having a pair of coaxially spaced apart ring-like side elements and a plurality of uniformly circumferentially spaced generally radial spacers rigidly interposed between the elements to afford a like plurality of die cells opening at radially opposite ends, said spacers likewise having radially opposite ends lying respectively on and establishing inner and outer peripheries for said annulus, said inner periphery providing a track for engagement by compressor means operative to force material into the track-proximate ends of the cells, the track-proximate ends of the spacers respectively having recesses therein opening directly radially to the track and alined in a circumferential row, a plurality of individual plate-like members, one for each cell, radially insertable into and withdrawable from the cells at said track, each member normally extending from one end toward the other end of its cell and having a track-proximate end portion received in an associated recess and exposed directly to said track; and means for removably securing the members against radial withdrawal from their cells at said track.

8. Die structure for a wafering machine, comprising: an annulus having a pair of coaxially spaced apart ring-like side elements and a plurality of uniformly circumferentially spaced generally radial spacers rigidly interposed between the elements to afford a like plurality of die cells opening at radially opposite ends, said elements having inner and outer peripheral portions affording inner and outer peripheries for said annulus, said spacers likewise having radially opposite end portions lying respectively at said peripheries, one of said peripheries providing a track for engagement by compressor means operative to force material into the track-proximate ends of the cells, said annulus having at track-proximate portions thereof a plurality of recesses opening radially directly to the track, said *recesses* [notches] being arranged in sets alined across the cells at the track-proximate ends thereof; a plurality of individual plate-like members, one for each cell, radially insertable into and withdrawable from the cells at said track, each member normally extending from one end toward the other end of its cell and having a track-proximate end portion received in an associated recess and exposed directly to said track; and means for removably securing the members against radial withdrawal from their cells at said track.

9. Die structure for a wafering machine, comprising: an annulus including inner and outer peripheries and having a pair of coaxially spaced apart ring-like side elements and a plurality of uniformly circumferentially spaced apart generally radial spacers affording a like plurality of generally radial die cells having radially opposite inner and outer ends opening respectively at said inner and outer peripheries of the annulus and each spacer likewise having radially opposite inner and outer ends respectively at said inner and outer peripheries, each spacer having at one end a notch opening at the adjacent periphery, said notches being alined in a circumferential row at the same periphery; a plurality of individual plate-like members equal in number to the cells, one member being disposed in each cell and extending radially from one end toward the other end thereof, each member being dimensioned for individual radial insertion into and radial withdrawal from its cell at the end of said cell at said same periphery, said members respectively having end portions adjacent to said row of notches and each member having at *its* said end portion a mounting part *exposed directly to said same periphery and* removably received in a notch in said row, *and means remote from the notches and engaging the members for retaining the members normally in place.*

10. Die structure for a wafering machine, comprising: an annulus including inner and outer peripheries and having a pair of coaxially spaced apart ring-like side elements and a plurality of uniformly circumferentially spaced apart generally radial spacers affording a like plurality of generally radial die cells having radially opposite inner and outer ends opening respectively at said inner and outer peripheries of the annulus and each spacer likewise having radially opposite inner and outer ends respectively at said inner and outer peripheries, means at one periphery of the annulus including a plurality of notches respectively at the ends of the cells at said periphery; a plurality of individual plate-like members equal in number to the cells, one member being disposed in each cell and extending radially from one end toward the other end thereof, each member being dimensioned for radial withdrawal from its cell at the end of said cell at said same periphery, said members respectively having end portions adjacent to said notches, respectively, and each member having at said end portion a mounting part removably received in an associated notch *and each member further having thereon in radially spaced relation to its said end portion means for normally retaining the member against removal.*

References Cited by the Examiner

The following references, cited by the Examiner, are of record in the patented file of this patent or the original patent.

UNITED STATES PATENTS 2,603,170 7/1952 Meakin ---------- 107—14 X

FOREIGN PATENTS 1,250,174 11/1960 France.

WALTER A. SCHEEL, *Primary Examiner.*

ROBERT E. PULFREY, *Examiner.*

JOSEPH D. SEERS, CHARLES A. WILLMUTH, *Assistant Examiners.*